June 1, 1965     A. E. DE BARBA     3,187,126

CHRONOMETRIC GOVERNOR

Filed June 28, 1962     3 Sheets-Sheet 1

INVENTOR.
ALBERT E. DeBARBA

BY *Mandeville & Schweitzer*
ATTORNEYS

June 1, 1965 A. E. DE BARBA 3,187,126
CHRONOMETRIC GOVERNOR
Filed June 28, 1962 3 Sheets-Sheet 2
FIG. 3     FIG. 4     FIG. 5     FIG. 6
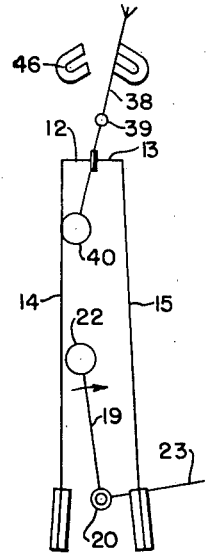 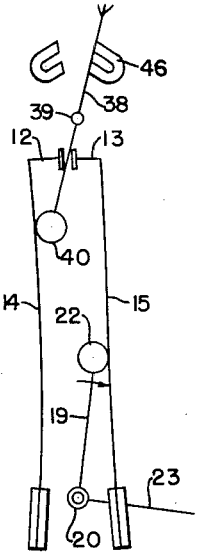 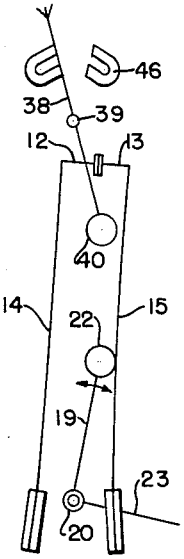 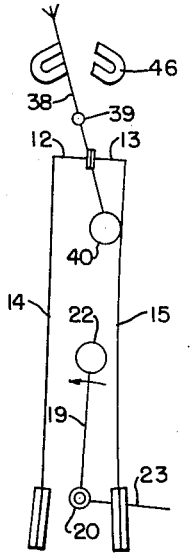
FIG. 8     FIG. 9     FIG. 10     FIG. 11     FIG. 12
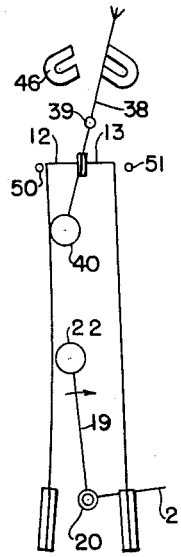 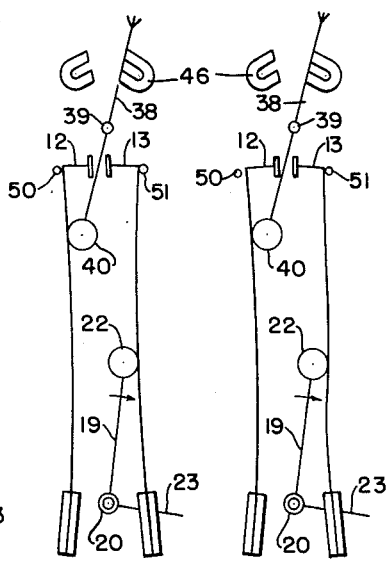 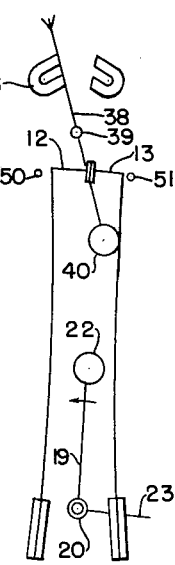
INVENTOR
ALBERT E. DeBARBA
BY
*Mandeville & Schweitzer*
ATTORNEYS

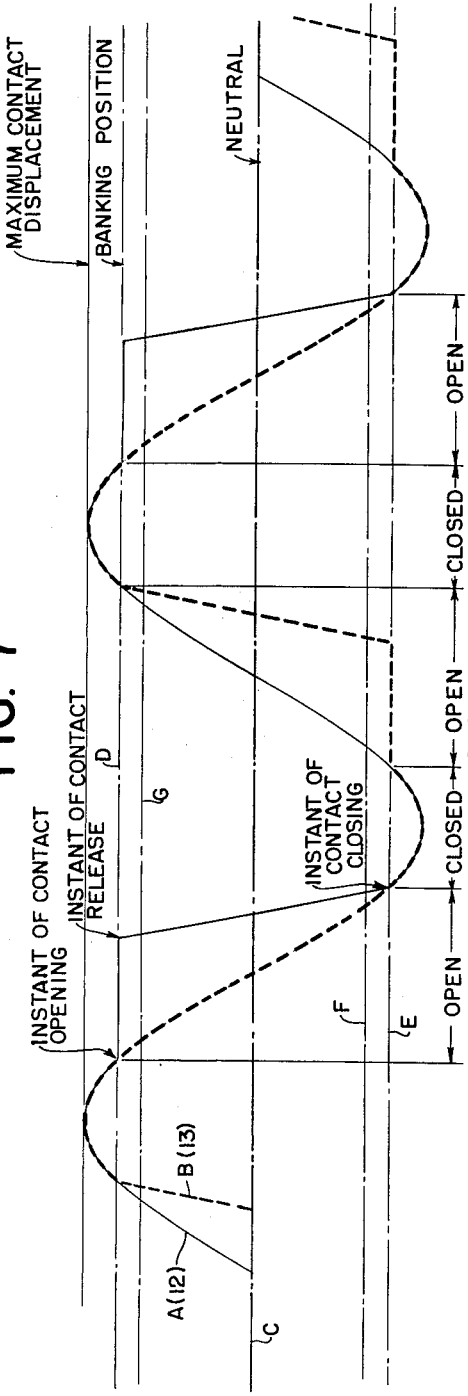
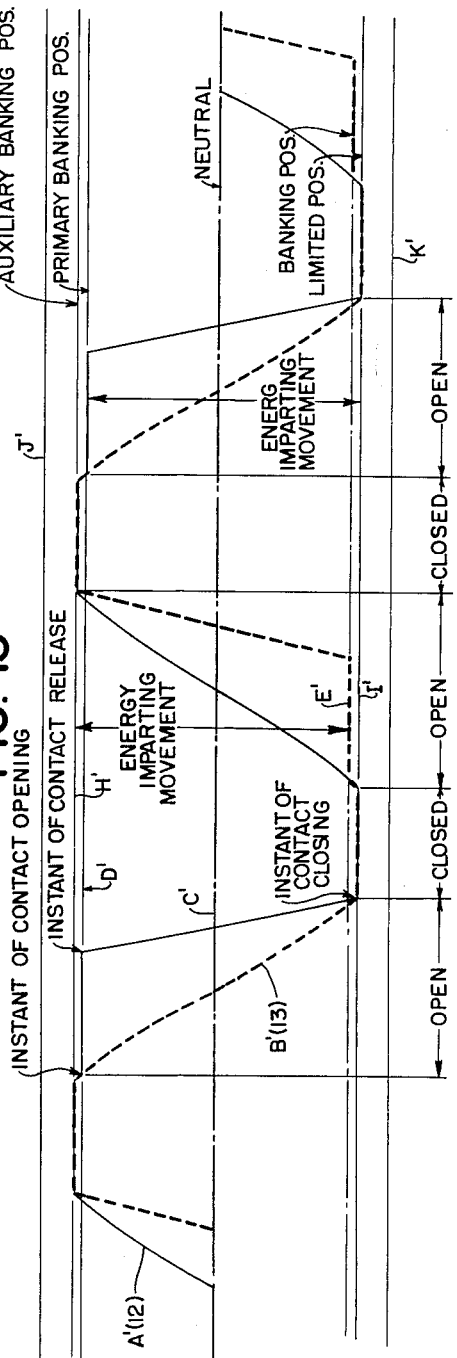

United States Patent Office 3,187,126
Patented June 1, 1965

3,187,126
CHRONOMETRIC GOVERNOR
Albert E. De Barba, Wolcott, Conn., assignor to Consolidated Electronics Industries Corp., Waterbury, Conn., a corporation of Delaware
Filed June 23, 1962, Ser. No. 205,978
9 Claims. (Cl. 200—52)

The present invention relates to motor speed governor mechanisms, and is directed more specifically to specific and advantageous modifications in so-called chronometric governor devices of the general type described and claimed in the Arthur W. Haydon United States Patent No. 2,523,298.

In the motor speed governor device of the above-mentioned A. W. Haydon patent, the speed of operation of an electric motor is governed by connecting the motor to a power supply tending to drive the motor at a speed greater than desired, and connecting and disconnecting the power source periodically, in accordance with the operations of a constant speed device and the motor, whereby the average speed of the motor is controlled with substantial precision regardless of substantial variations in load, source voltage, etc. An important principle of the aforesaid Haydon patent resides in the provision of a motor governor device in which a power supply circuit is opened periodically at instants determined by the travel of the motor, and in which the circuit is subsequently closed at predetermined instants determined by the operation of a constant speed device, such as a hair spring-balance wheel combination. The device of the present invention incorporates the basic principles of the Haydon patent before referred to, but constitutes a specific departure therefrom, particularly in respect of the mechanism utilized for interrelating the operations of the motor with periodic closings of the motor controlling circuit.

The device of the present invention is adapted particularly for, although not necessarily limited to, applications involving especially high speeds of operation and/or large external acceleration forces, where positive control over inertia-laden elements of the mechanism is of substantial importance and where wearing of the moving parts represents a significant problem. Thus, in the device of the beforementioned Haydon Patent No. 2,523,-298, and in subsequent specific improvements made thereon, a desired oscillation of resiliently mounted governor contacts has been accomplished in an advantageous manner by means of cam and cam follower arrangements, which are designed to achieve a particularly desirable result. Where the system is to be operated at very high speeds, however, the otherwise desirable cam and cam follower arrangement may result in substantial wear, with a corresponding reduction in the operating life of the mechanism, and other problems may be experienced because of inertia of the moving parts. Accordingly, the present invention provides a chronometric governor mechanism in which the principal, inertia-laden operating parts are positively connected through a system including a motor driven eccentric and a positive connecting bearing such that, regardless of speed of operation, the inertia-laden parts are driven in the desired cyclical pattern of operation. Moreover, the mechanism of the invention accommodates the use of anti-friction bearings, such that the problem of wear resulting from large inertia or acceleration forces is reduced to a significant degree.

In the device of the invention, cyclical displacement of the governor contacts is brought about through the substantial sinusoidal oscillation of an actuating lever which, theoretically, is not an ideal motion for displacement of the resiliently mounted governor contacts, since substantially uniform increments of energy must be derived from the displaced, resiliently mounted contacts, in order to keep the balance wheel or other constant speed mechanism in sustained motion at an accurately predetermined frequency of operation. However, the mechanism of the present invention includes means for modifying the sinusoidal displacement of the governor contacts, in such a way as to approximate very closely uniform energy inputs to the constant speed mechanism, over a wide range of governor operation.

In one specific form of the invention, means are provided to establish a banking position for the respective governor contacts when they are displaced by the sinusoidally operated actuating lever, such that the displaced positions of the contacts are pre-established and are not effected by the sinusoidal motion of the actuating lever when a displaced contact subsequently is released by the constant speed mechanism. A contact thus released travels through a substantial fixed distance which, throughout a substantial range of operation, varies only slightly over a relatively flat portion of the sinusoidal curve, in such a manner that variations are very minor, relative to the overall displacement of the contact. In addition, and particularly where the constant speed mechanism comprises a balance wheel and hair spring system, the arrangement of parts is such as to even further minimize, to a substantially negligible degree, variations in energy input to the balance wheel.

In a second form of the invention, means are provided to establish banking positions for both extremes of movement of the displaced governor contacts such that, within a predetermined, substantial operating range of the mechanism, the displacement of governor contacts upon release by the constant speed mechanism is reliably uniform.

For a better understanding of the invention, reference should be made to the following detailed description and to the accompanying drawings, in which:

FIGS. 3–6 are sequential views, in schematic form, illustrating the mode of operation of the mechanism of FIG. 1;

FIG. 7 is a simplified graphic representation of the mode of operation of the mechanism of FIG. 1;

FIGS. 8–12 are sequential views, in schematic form, illustrating the mode of operation of a second form of mechanism incorporating the principles of the invention; and FIG. 13 is a simplified graphic representation of the operation of the mechanism of FIGS. 8–12.

Figure 1:
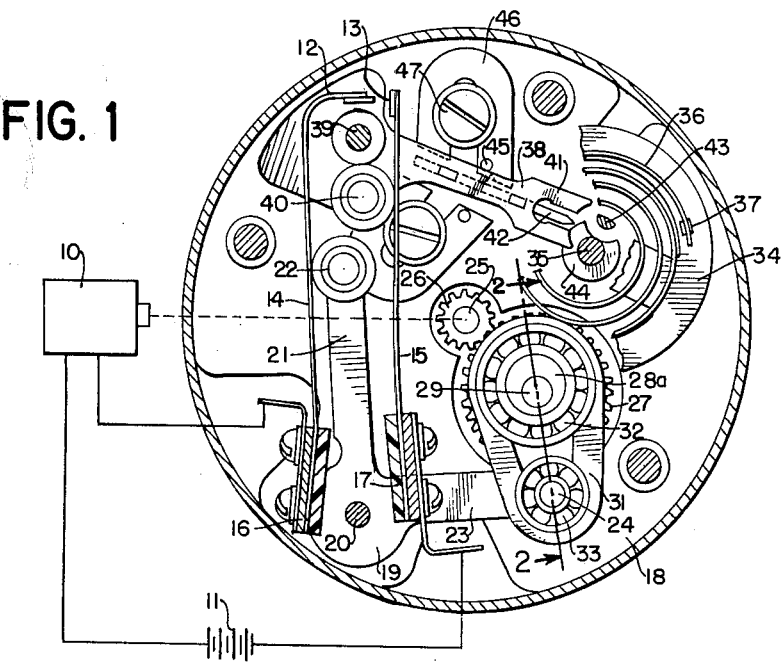
FIG. 1 is a cross-sectional view of a motor governor mechanism incorporating the principles of the invention.
Figure 2:
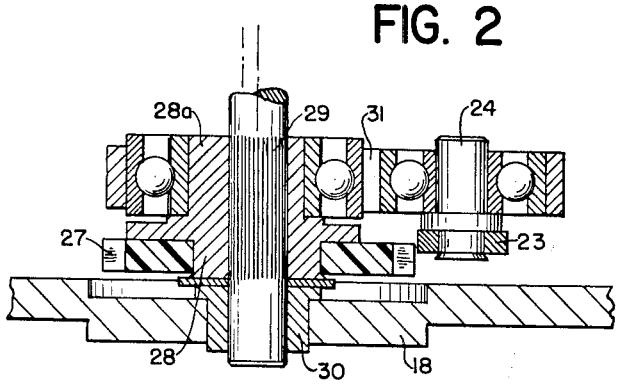
FIG. 2 is an enlarged, fragmentary, cross-sectional view taken along line 2—2 of FIG. 1.

Referring now to the drawings, and initially to FIGS. 1–2, the reference numeral 10 designates generally an electric motor, which typically may be a conventional D.C. motor. The motor 10 is arranged to be connected to a source of driving potential, represented by a battery 11, through a circuit including a pair of governor contacts 12, 13. The relationship of the source 11 to the motor 10 is such that, under normal conditions of operating load and driving potential, the motor will tend to operate at a speed higher than that desired, and the actual operating speed is controlled at a predetermined level through appropriate opening and closing of the governor contacts 12, 13.

As illustrated in FIG. 1, the governor contacts 12, 13 are mounted on elongated, resilient supports 14, 15, which are anchored in insulating blocks 16, 17 secured to a frame plate 18 of the motor governor mechanism. The arrangement of contacts and resilient supports is such that either contact may be displaced in a direction away from the other through a substantial distance, without actually causing separation of the contacts, the displaced contact being "trailed" by the opposing contact through the bias of its resilient support.

For effecting alternate displacement of the governor contacts 12, 13, there is provided a bell crank actuating lever 19, which is pivoted to the frame plate 18 by means of a stud shaft 20. The actuating lever has an arm 21 extending upward (as viewed in FIG. 1) generally between the contact supports 14, 15 and mounting an actuating element 22 at its free end. The actuating element 22 lies between the contact supports, advantageously about halfway between the contacts 12, 13 and the anchor blocks 16, 17. Thus, when the actuating lever is pivoted about the stud shaft 20 with an oscillating motion, the contact supports 14, 15 alternately are displaced in an "outward" direction, away from the other contact support. The actuating lever 19 also includes a second arm 23, which extends in a generally horizontal direction (as viewed in FIG. 1) and mounts a stud shaft 24 at its free end.

In accordance with one aspect of the invention, the actuating lever 19 is driven in a positive manner and with a substantially sinusoidal oscillating motion by the motor 10. To this end, the output shaft 25 of the motor mounts a drive pinion 26, which meshes with and drives a reduction gear 27. As shown best in FIG. 2, the reduction gear 27 is fixed to an eccentric bushing 28, and the latter is, in turn, fixed to a shaft 29 journaled for rotation in a bearing 30 in the frame plate 18. The eccentric portion 28a of the bushing 28 advantageously is of circular form and, in a typical, practical embodiment of the invention, has an eccentricity, relative to the axis of rotation of the shaft 29, of about 0.010 inch.

A connecting link 31 positively connects the eccentric bushing 28 with the stud shaft 24 carried by the free end of the actuating lever arm 23, such that the actuating lever 19 is rocked about its pivot shaft 20 in a positive manner and with a substantially sinusoidal speed pattern by rotations of the motor driven eccentric 28. The described arrangement for achieving positive, sinusoidal motion of the actuating lever 19 is particularly desirable where the mechanism is intended to be driven at extremely high speeds, since the sinusoidal output keeps inertia forces at a practical minimum, and the positive drive connection to the actuating lever assures that the motion of the lever will not be changed by inertia and external acceleration forces.

Where there is a requirement for long operating life, the mechanism of the invention advantageously incorporates anti-friction bearing connections (or low friction journal bearings) between the eccentric bushing 28 and the connecting link 31, and between the connecting link and the stud shaft 24 of the actuating lever (the term "anti-friction bearing" referring to ball bearings, roller bearings, needle bearings, or the like, as distinguished from ordinary journal bearings having surfaces in sliding relation). Thus, a first anti-friction bearing 32 has its inner race mounted on the eccentric bushing 28 and its outer race secured in the connecting link 31, while a second anti-friction bearing 33 has its inner race mounted on the stud shaft 24 and its outer race secured in the connecting link. In this respect, the connecting link 31 may advantageously be formed to have the configuration of a closed loop, with end recesses in the form of incomplete circles, to receive the outer races of the bearings 32, 33. The manufacturing tolerances may be so calculated that the bearings are tightly gripped by the connecting link, upon insertion in the end recesses.

Acting in conjunction with the motor driven mechanism for alternately displacing the governor contacts 12, 13 is a constant speed mechanism operative to retain the contacts momentarily in their displaced positions and to release them at predetermined instants in the operating cycles, so that cyclical closure of the contacts takes place at predetermined instants which are independent of the operation of the motor 10 and the elements driven thereby. In the illustrated arrangement, the constant speed mechanism includes a balance wheel 34 mounted on a balance staff 35 and arranged to be oscillated under the influence of a hair spring 36 anchored at one end (not shown) to the balance wheel and at its other end 37 to a fixed part of the frame. The arrangement is such that, when the balance wheel 34 is set to oscillating motion, it will continue to oscillate at a predetermined frequency, the frequency being a function of the characteristics of the hair spring and the inertia of the balance wheel. Sustained oscillation of the balance wheel is achieved by periodically imparting minute energy impulses thereto to counterbalance energy losses through friction.

Cooperating with the balance wheel 34 is a pallet lever 38, which is pivoted on the frame plate 18 by a shaft 39 and carries a restraining arm 40, the latter being positioned between the resilient contact supports 14, 15, advantageously between the actuating element 22 and the governor contacts 12, 13.

The pallet lever 38 has a forked end 41, which is divided by a locking pin 42 and is arranged to lie closely adjacent the balance staff 35. In accordance with well-known timekeeping principles, the forked end of the pallet lever cooperates with an impulse pin 43 and locking disk 44 carried by the balance wheel 34, such that the pallet lever is actuated alternately from one banking position to another by oscillations of the balance wheel.

Predetermined banking positions for the pallet lever 38 are established by the provision of small banking pins 45, mounted at each side of the pallet lever and serving to limit the pivotal movement thereof to a small, predetermined angular displacement on either side of a central, neutral axis. Advantageously, the banking pins 45 are associated with banking magnets 46, which are adjustably secured to the frame plate 18 by screws 47. The arrangement is such that, when the pallet lever 38 is brought into or near a banking position, the pallet lever falls under the influence of the adjacent banking magnet, which holds the pallet lever against the adjacent banking pin 45 with a predetermined small force, which can be overcome by the next impulse applied to the pallet lever by the oscillating balance wheel. The provision of the banking magnets 46 largely does away with the need for locking pin 42 and locking disk 44, since the banking magnets will hold the locking pin out of contact with the disk 44, substantially as shown in FIG. 1, during normal operations of the mechanism. However, the mechanical locking arrangements are desirable as a safety provision, in the event the mechanism is subjected to an unusual shock force, for example.

When the mechanism of the invention is set in motion by energization of the motor 10, the contact supports 14, 15 are oscillated back and forth by the actuating lever 19. Initially, the balance wheel and pallet lever constant speed system is at rest, but the restraining arm 40 is struck alternately by the contact supports 14, 15, during the acceleration of the motor, such that the balance wheel 34 is set in motion at its predetermined frequency. As the motor 10 accelerates through its governed speed level, oscillations of the actuating lever 19 will tend to lead the oscillations of the constant speed system. Accordingly, when the actuating lever 19 is rocked in a counterclockwise direction, for example, leading the motion of the pallet lever 38, the lefthand contact support 14 will be displaced outward while the righthand contact support 15 is held by the restraining arm 40. This opens the motor circuit causing a deceleration of the motor. At a predetermined instant in the operating cycle, the balance wheel 34 will strike and release the pallet lever 38, causing it to move from its upper banking position, as shown in FIG. 1, to its lower banking position, releasing the contact support 15 and allowing the governor contacts to close. In the meantime, the lefthand contact support 14 has been displaced outward sufficiently to permit the restraining arm 40 to move to the left and be locked by the action of the lower banking magnet 46 on the pallet lever 38.

During the reverse oscillation of the actuating lever 19, indicated schematically in FIGS. 3–6, the actuating element 22 moves away from the contact support 14, which is held in its displaced position by the locked restraining arm 40. Ultimately, the actuating element 22 engages the contact support 15, displacing it outward to the right and separating the contact 13 from the contact 12, now held by restraining arm 40, as indicated in FIG. 4. This again opens the motor circuit and causes the motor to decelerate until, at a predetermined instant in the operating cycle, the pallet lever 38 is released by the balance wheel, permitting the contact support 14 to spring to the right and close the governor contacts 12, 13.

The above-described cycle of operations continues indefinitely, as long as the energy source and motor load are such as to cause the motor 10 to tend to operate at a speed above the predetermined governed speed. The motor repetitively accelerates and decelerates, during each half cycle of oscillation of the constant speed system, so that the average speed of the motor is related accurately to the frequency of the constant speed system, and the instantaneous speed of the motor varies only slightly therefrom.

In order to keep the balance wheel 34 in sustained oscillation, minute energy inputs must be imparted to the balance wheel to make up for frictional losses. Such energy inputs are accommodated in the system of the invention by causing the resiliently biased contact supports 14, 15 to act against the pallet lever 38 upon each occasion of release of the pallet lever by a banking magnet. Thus, when the pallet lever is released from the influence of a banking magnet, a displaced and theretofore restrained contact support will act against the restraining arm 40 to swing the pallet lever and impart an energy impulse to the balance wheel through the impulse pin 43.

In order to keep the timekeeping mechanism reliably accurate, it is important to maintain the energy impulses to the balance wheel as uniform as possible and to maintain them substantially independent of the speed of the motor. In previous chronometric governor mechanisms, as typified by the before-mentioned A. W. Haydon Patent No. 2,523,298, special cam means have been provided which cause the resilient contact supports, when released, to act upon the pallet lever through an accurately predetermined distance, and it was believed that, for optimum results, a sinusoidal motion of the actuating lever 19 should not be utilized. However, in accordance with the present invention, a sinusoidal oscillating motion of the actuating lever 19 can be utilized while retaining high accuracy over a substantial operating range of the governed system.

Referrring now to FIG. 7, there is illustrated a graphic representation of the pattern of operation of the mechanism of the invention, related specifically to the motions of the governor contacts 12, 13 and their resilient supports 14, 15. The solid line A of the graph represents a modified sinusoidal curve followed by the governor contact 12, while the broken line B represents a modified sinusoidal curve followed by the governor contact 13. A central, horizontal line C represents a neutral or centered position, and horizontal lines D and E, spaced above and below the neutral line, represent displacements of the contacts 12, 13 respectively in their "banked" positions, as restrained by the pallet lever 38 in one of its alternative banking positions.

Following the graph of FIG. 7, starting from the left, the contact 12 is displaced outward to the left from a neutral position, following a substantially sinusoidal curve (with time as a base), travelling outward beyond the banking position and returning back to the banking position, represented by the line D. The contact 12 is then held in the banking position, as indicated by a horizontal extension of the line A along the line D, until a predetermined instant in the operating cycle, when the contact 12 is released by the constant speed system. In the meantime, while the contact 12 is held in its banking position, the contact 13 is displaced outward to the right by the actuating lever, with a substantially sinusoidal motion, as indicated by the broken line B, and the displacement of the contact 13 carries beyond the banking line E and then the contact 13 is returned to the banking position and held therein by the restraining arm 40. (In the graph, for purposes of clarity of illustration, it is assumed that the actuating element 22 occupies the entire space between the contact supports 14, 15, which normally is not the case in actual practice. The principles illustrated, however, are applicable to a typical device according to the representation of FIG. 1.)

At the instant of release of the contact 12 and its support 14, the contact travels through a distance until it meets and engages the contact 13, and this distance of travel should be kept as uniform as possible for optimum timekeeping accuracy. As illustrated in the graph of FIG. 7, the displacement of the contact at the instant of release is not effected by the sinusoidal motion of the actuating lever 19, since the contact at that instant is restrained in its banking position. Some variation is experienced in the total distance of movement, however, in view of the variable displacement, with time, of the contact 13, since the contact 13 is still in sinusoidal motion, not having reached its banking position. However, as indicated in FIG. 7, the instant of contact between the governor contacts 12, 13, which determines the total distance of movement of the released contact, occurs over a relatively flat portion of the sinusoidal curve, such that the actual variation in the travel of the released contact is quite small and, as can be observed from the graph, represents a very small percentage of the total distance of movement. Moreover, the variation in travel of a released contact represents a variation in the terminal portion of its travel and, with proper mechanical design of the pallet lever and balance wheel, the arrangement is such that, at this instant of the cycle, the pallet lever 38 already has disengaged itself from the balance wheel 34, in which case the terminal variation would be without any effect on the energy input to the balance wheel. Thus, by so designing the pallet lever and balance wheel that disengagement thereof is effected by the time a released contact reaches a displacement represented by lines F or G of the graph of FIG. 7, terminal variation in the motion of the released contact would have no effect, and the periodic energy inputs would be completely uniform, as represented on the graph of FIG. 7 by the distance between the banking line D and the disengagement line F, or the distance between the banking line E and the disengagement line G.

In the graph of FIG. 7, the power circuit in the motor 10 is open from the instant of contact opening to the instant of contact closing, which is represented by the deviation of the curve from the primary, sinusoidal form. The instant of contact release remains constant in the cycle; and thus, if the motor load is reduced, for example, to increase the tendency of the motor to overspeed, the sinusoidal curve will, in effect, be shifted to the left, increasing the time between the instant of contact opening and the instant of contact release. Conversely, if the motor load is increased, the sinusoidal curve will, in effect, shift to the right, reducing the time between the time of the instant of contact opening and the instant of contact release.

In the form of the invention represented by FIGS. 8–13, special means are provided for reliably assuring uniformity of energy input to the constant speed system, substantially independently of the mechanical design of the constant speed system, by causing the energy imparting movements of the contact supports to be uniform in all cases, notwithstanding the generally sinusoidal operation of the actuating lever 19. Thus, in the system of FIGS. 8–13, a mechanism substantially identical to that shown in FIGS. 1 and 2 may be utilized, with the exception that auxiliary banking means, in the form of auxiliary banking pins 50, 51, are provided to limit the outward displacement of the contact elements 12, 13. Thus, referring initially to FIG. 8, the condition of the contact supports 14, 15, pallet lever 38, and actuating lever 19 is substantially identical to that illustrated in FIG. 3, with the contact support 14 being held in a predetermined banking position by the magnetically banked pallet lever 38, and the actuating element 22 travelling to the right by operation of motor 10.

When the actuating element 22 engages and displaces the contact support 15, as indicated in FIG. 9, the contacts 12, 13 are opened, in substantially the same manner as indicated in FIG. 4. However, after a predetermined outward displacement of the contact support 15, further outward movement of the contact is prevented by engagement of the contact (or of the contact support in a region adjacent the contact) with the righthand auxiliary banking member 51. The actuating element 22 continues its outward motion, following a sinusoidal pattern of movement, but the contact 13 itself remains fixed against the auxiliary banking element 51. Subsequently, when the pallet lever 38 is released from its banking position, as indicated in FIGS. 10 and 11, the contact 12 moves into engagement with the contact 13; in doing so, the contact 12 moves through a uniformly predetermined distance from the primary banking position of the contact 12 to the auxiliary banking postion of the contact 13, imparting a definite, predetermined increment of energy to the balance wheel system.

As the motor 10 continues to rotate, the actuating element 22 reverses and moves to the left, as illustrated in FIG. 12, releasing the contact support 15 for slight inward movement, from its auxiliary banking position to its primary banking position, wherein it is restrained by the element 40 of the pallet lever. Advantageously, the distance between the auxiliary and primary banking positions of a particular contact support is very small, just sufficient to permit the pallet lever 38 to be moved reliably into its banked position without restraint from the outwardly displaced contact support.

Referring to the graph of FIG. 13, the curve A' represents the displacement of the contact 12, while the curve B' represents the displacement of the contact 13. Horizontal line C' represents a neutral displacement; the horizontal lines D' and E' represent primary banking displacements of the contacts 12, 13; the horizontal lines H' and I' represent auxiliary banking displacements of the contacts 12, 13; and the horizontal lines J' and K' represent theoretical maximum displacements of the sinusoidal curves followed in part by the contacts 12, 13. Thus, as indicated in FIG. 13, the outward displacement of the contact 12 from the neutral position follows a sinusoidal curve, until reaching auxiliary banking displacement, represented by the line H', in which position the contact itself remains even though the sinusoidal displacement of the actuating lever itself (and portions of the contact support) continues. When the actuating lever returns in the opposite direction, the contact 12 is released through a slight distance to a primary banking position represented by the line D', in which the contact is held by the pallet lever until the instant of release, as determined by the oscillating balance wheel. The contact 12, upon its release, then travels through a predetermined distance, from its primary banking position to the auxiliary banking position of the contact 13, represented by the horizontal line I'.

In general, the operation of the mechanism of FIGS. 8–13 is the same as that of FIGS. 1–7, except that the energy imparting movements of the contact supports 14, 15 are positively defined and wholly independent of the sinusoidal motions of the actuating lever 19.

The motor governor assembly of the invention, while utilizing the novel and advantageous principles of the A. W. Haydon Patent No. 2,523,298, incorporates modifications adapting the mechanism specifically for operation at unusually high speeds and/or under conditions in which the mechanism is subject to large external acceleration forces. Thus, the relatively inertia-laden actuating lever 19 is driven positively by the motor 10, through a direct linkage, including a driven eccentric. This assures proper operation of the actuating lever 19, substantially regardless of the speed of operation and of externally applied accelerations. And, while the drive arrangement does impart a theoretically undesirable sinusoidal motion to the actuating lever 19, provisions are made whereby the effect of the sinusoidal motion is substantially isolated from the constant speed system of the assembly, to the end that substantially uniform increments of energy input are imparted to the constant speed system for optimum "timekeeping" or governing accuracy.

Thus, in one form of the invention, the operation is such that any variations in energy input resulting from the sinusoidal motion of the actuating lever 19 represent an extremely small percentage of the overall energy derived from the system, so that the practical effect of variations is greatly minimized. In another form of the invention, the mechanical design of the constant speed system is such that variations in the energy imparting movements of the contact supports, arising at the terminal portions of the movements, occur after the disengagement of the energy input system, such that no variation is experienced in the periodic energy input, due to the sinusoidal motion of the actuating lever. In still another form of the invention, auxiliary banking means are provided, forming positive limits to the energy imparting movements of the contact supports, which limits are independent of the sinusoidal motions of the actuating lever and serve, in effect, to flatten the extremes of the sinusoidal cycle movement.

One of the specific, practical advantages of the mechanism of the invention resides in the fact that the input system from the governed motor accommodates the provision of anti-friction bearings, so that the mechanism may be operated over long periods of time and under unusual stresses, caused by high speed or other influences, without undue deterioration through wear. Thus, it has been considered impractical heretofore to employ anti-friction bearings in the actuating lever drive, even though it is known to be subject to rapid wear, because of the accompanying requirement for sinusoidal output motion of the actuating lever. However, the mechanism of the invention is designed specifically to accommodate and make practical use of such sinusoidal output motion, whereby advantageous use may be made of anti-friction bearings in the system.

It should be understood that the specific forms of the invention herein illustrated and desccribed are intended to be representative only, as certain changes may be made therein without departing from the clear teachings of the disclosure. Accordingly, reference should be made to the following claims in determining the full scope of the invention.

I claim:
1. In a motor and governor assembly of the type comprising
   (a) a motor adapted when connected to a predetermined power source to operate at a speed in excess of a predetermined governed speed,
   (b) circuit means for controlling said motor including a pair of governor contacts and resilient supporting elements for said contacts,
   (c) motor driven means for repetitively opening said contacts at instants determined by the instantaneous speed of the motor, and
   (d) constant speed means including pallet lever means for closing said contacts periodically at predetermined instants independent of the speed of the motor, the improvement in said motor driven means comprising
- (e) an actuating lever means pivoted for reciprocating movement and having a portion engageable alternatively with said governor contacts to displace and open said contacts in accordance with the instantaneous speed of the motor,
- (f) eccentric means driven by the motor,
- (g) link means positively connecting said eccentric means and said actuating lever means for oscillating said actuating lever means in accordance with rotations of said motor and eccentric means,
- (h) bearing means joining said link means to said eccentric means and to said actuating lever means, whereby said lever means is regularly sinusoidally moved by rotations of said motor, said constant speed means, said link, and said bearing means being so related that under normal conditions of load and voltage said governor contacts are closed by said constant speed means at periods in which the rate of change of the sinusoidal movement of said lever is at a substantial minimum and
- (i) banking means cooperating with said pallet lever means for temporarily restraining altenate individual ones of said governor contacts in a position of predetermined displacement,
- (j) said banking means being effective to restrain said contacts in positions not substantially inward from positions of maximum displacement effected by said actuating lever.

2. The motor and governor assembly of claim 1, in which
- (a) said bearing means comprises a first anti-friction bearing joining said eccentric means with said link means.

3. The motor and governor assembly of claim 2, in which
- (a) said bearing means includes a second anti-friction bearing joining said link means with said actuating lever means.

4. The motor and governor assembly of claim 1, which includes
- (a) secondary banking means associated with said governor contacts for limiting outward displacement thereof substantially to the positions of predetermined displacement determined by said first mentioned banking means.

5. The motor and governor assembly of claim 4, in which
- (a) said actuating lever means acts upon said resilient supporting elements at points spaced from siad secondary banking means, and
- (b) said actuating lever means is operative to displace said resilient supporting elements to an extent such that said governor contacts are engaged by said secondary banking means prior to said supporting elements reaching positions of maximum displacement.

6. The motor and governor assembly of claim 4, in which
- (a) said actuating lever means acts resiliently upon said governor contacts, and
- (b) said actuating lever means is operative to displace said contacts into engagement with said secondary banking means prior to reaching a condition of maximum displacement.

7. In a motor and governor assembly of the type comprising
- (a) a motor adapted when connected to a predetermined power source to operate at a speed in excess of a predetermined governed speed,
- (b) circuit means for controlling said motor including a pair of governor contacts and resilient supporting elements for said contacts,
- (c) motor driven means for repetitively opening said contacts at instants determined by the instantaneous speed of the motor,
- (d) and constant speed means including pallet lever means for closing said contacts periodically at predetermined instants independent of the speed of the motor, the improvement in said motor driven means comprising
- (e) an actuating lever means pivoted for reciprocating movement and having a portion engageable alternatively with said governor contacts to displace and open said contacts in accordance with the instantaneous speed of the motor,
- (f) eccentric means driven by the motor,
- (g) bearing means joining said eccentric means and said actuating lever means, whereby to effect positive, sinusoidal movements of said lever by rotations of said motor, said constant speed means, said link, and said bearing means being so related that under normal conditions of load and voltage said governor contacts are closed by said constant speed means at periods in which the rate of change of the sinusoidal movement of said lever is at a substantial minimum and
- (h) banking means cooperating with said pallet lever means for temporarily restraining alternate individual ones of said governor contacts in a position of predetermined displacement,
- (i) said banking means being effective to restrain said contacts in positions not substantially inward from positions of maximum sinusoidal displacement effected by said actuating lever.

8. The motor and governor assembly of claim 1, in which
- (a) said bearing means comprises an anti-friction bearing.

9. The motor and governor assembly of claim 8, which includes
- (a) secondary banking means limiting outward displacement of said contacts independently of said actuating lever means to positions not substantially outward of the positions of predetermined displacement of said contacts determined by the first mentioned banking means.

References Cited by the Examiner
UNITED STATES PATENTS

| | | | |
|---|---|---|---|
| 1,723,335 | 8/29 | Dyess | 74—42 |
| 2,523,298 | 9/50 | Haydon | 318—311 |

BERNARD A. GILHEANY, *Primary Examiner.*

ROBERT K. SCHAEFER, *Examiner.*